United States Patent [19]

Veazey

[11] Patent Number: 4,485,233
[45] Date of Patent: Nov. 27, 1984

[54] POLY(ESTER-AMIDE) HOT-MELT ADHESIVES

[75] Inventor: Richard L. Veazey, East Windsor, N.J.

[73] Assignee: Union Camp Corporation, Wayne, N.J.

[21] Appl. No.: 583,963

[22] Filed: Feb. 27, 1984

[51] Int. Cl.³ .............................................. C08G 63/54
[52] U.S. Cl. .................................. 528/295.3; 528/288; 528/289; 528/295.5
[58] Field of Search ..................... 528/288, 289, 295.3, 528/295.5

[56] References Cited

U.S. PATENT DOCUMENTS

| | | | |
|---|---|---|---|
| 3,900,436 | 8/1975 | Drawert et al. | 528/288 |
| 4,207,217 | 6/1980 | Guainazzi | 528/295.3 X |
| 4,217,256 | 8/1980 | Peerman et al. | 528/289 |
| 4,397,991 | 8/1983 | Drawert et al. | 528/295.3 X |
| 4,433,117 | 2/1984 | Takayanagi et al. | 528/289 X |
| 4,446,301 | 5/1984 | Belote et al. | 528/295.3 |

*Primary Examiner*—Lucille M. Phynes
*Attorney, Agent, or Firm*—Kane, Dalsimer, Kane, Sullivan and Kurucz

[57] ABSTRACT

There is disclosed a group of poly(ester-amide) compositions which possess good adhesive properties with respect to vinyl based substrates. They also possess long open assembly times. These poly(ester-amide) compositions are the reaction product of a polymeric fatty acid, with an organic diamine, dicarboxylic acid and a diol.

15 Claims, No Drawings

POLY(ESTER-AMIDE) HOT-MELT ADHESIVES

BACKGROUND OF THE INVENTION

1. Field of the Invention

The invention relates to poly(ester-amides) and more particularly relates to poly(ester-amide) hot-melt adhesive compositions.

2. Brief Description of the Prior Art

Poly(ester-amide) hot-melt adhesive compositions have been described in the prior art literature; see for example the descriptions given in the U.S. Pat. Nos. 3,377,303; 4,004,960; 4,341,671 and 4,343,743. These poly(ester-amides) are particularly useful for bonding polyvinyl chloride surfaces. We have now found that particular poly(ester-amides) formed by the condensation of substantially equivalent proportions of a mixture of polymeric fatty acids and dicarboxylic acids with a mixture of particular organic diamines and diols wherein the diamines and diols contain a high proportion of non-hydrogen bonding groups or contain an odd number of carbon atoms, have advantageous crystallization properties. These properties provide hot-melt adhesives with long open assembly times; i.e. they retain tackiness for a long period of time during which the melted composition is cooling to ambient temperatures.

SUMMARY OF THE INVENTION

The invention comprises a poly(ester-amide) adhesive composition with a long open assembly time (OAT) as evidenced by slow loss of tack, a slow decrease in bonding strength with increasing assembly time and the existence of a low or non-detectable $T_{cc}$ value, which comprises the product of the polymerization of (a) from 10 to 60 equivalent percent of a polymeric fatty acid and (b) from 40 to 90 equivalent percent of a linear dicarboxylic acid; with a substantially equivalent amount of (c) from 40 to 90 equivalent percent of an organic diamine; and (d) from 40 to 60 equivalent present of a diol.

The poly(ester-amide) comositions of the invention are useful hot-melt adhesives, particularly for the bonding of polyvinyl chloride films.

The term "$T_{cc}$" as used herein means temperature of crystalization upon cooling and is measured by differential scanning calorimetry techniques.*

*Turi, E. A., "Thermal Characterization of Polymeric Materials", Academic Press, New York, 1981, p. 274-275.

DETAILED DESCRIPTION OF THE PREFERRED EMBODIMENTS OF THE INVENTION

The reactants employed to prepare the poly(ester-amide) compositions of the invention are all well known as are the methods of their preparation. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

| | % BY WEIGHT |
| --- | --- |
| $C_{18}$ monobasic acids (monomer) | 0-10 |
| $C_{36}$ dibasic acids (dimer) | 60-95 |
| $C_{54}$ and higher polybasic acids (trimer) | 1-35 |

The relative ratios of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681.

A wide variety of dicarboxylic acids may also be employed together with the polymeric fatty acids in the preparation of the compositions of the invention. These include aliphatic, cycloaliphatic and aromatic dicarboxylic acids. Representative of such acids, which may contain from 2 to 20 carbon atoms, are oxalic, glutaric, malonic, adipic, succinic, suberic, azelaic, sebacic, dodecanedioic and pimelic. Methods of preparing these preferred acids are well known, and they are readily available commercially.

Preferred dicarboxylic acids employed in the invention are straight chain aliphatic diacids having at least 6 carbon atoms and more preferably 6 to 12 carbon atoms, such as azelaic and sebacic acids, which are most preferred. It should be understood that use of the corresponding acid anhydrides, esters, and acid chlorides of these acids is included in the term "dicarboxylic acid".

The organic diamines preferably employed in preparing the compositions of the present invention may be one or more of the known linear aliphatic, cycloaliphatic or aromatic diamines having from about 2 to 20 carbon atoms. Preferred especially are the alkylene diamines. Illustrative of the preferred diamines are ethylene diamine, 1,3-diaminopropane, 1,4-diaminobutane diamine, 1,6-hexamethylene diamine (HMDA), 4,4'-methylene-bis-(cyclohexylamine) 2,2-bis(4-aminocyclohexyl) (4',4'-cyclohexylamine)propane, isophorone diamine, cyclohexanebis-(methylamines), and bis-1,4-(2'aminoethyl)-benzene. Also preferred are the polyglycol diamines such as Jeffamine ® D-2000 available from Texaco and Polyglycol diamine H-221 available from Union Carbide Corporation. Most preferred are the secondary diamines such as piperazine (PIP) and 1,3-dipiperidyl propane or diamines with an odd number of carbon atoms such as 1,3-diaminopropane. These diamine compounds are all prepared by well known methods and many are commercially available.

Diols employed in the invention described above are also generally well known compounds as are the methods of their preparation. Representative of preferred diols are straight chain aliphatic diols such as ethylene glycol, 1,3-propylene glycol, 1,4-butylene glycol, 1,6-hexamethylene glycol and the like. Particularly preferred as the diol component of the poly(ester-amides) of the invention are cyclic diols such as 1,4-bis(hydroxymethyl)cyclohexane known as 1,4-cyclohexanedimethanol and the like.

The techniques and general method of polymerizing the mixed reactants is generally well known; see for example U.S. Pat. Nos. 3,377,303 and 4,343,743. In general, the poly(ester-amides) of the present invention may be prepared by charging a resin kettle with the reactants, in proportions as hereinabove described and heating the mixture to a temperature at which random polymerization occurs. In general, the reactants are heated to a temperature of from about 130° to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion. Representative of such catalysts are phosphoric acid and tin oxalate, manufactured by M & T Chemicals as FASCAT® 2001. The heating of the reaction mixtures may be carried out until a selected viscosity of the reaction mixture is reached, e.g. 1,000-100,000 cps at 195° C. and preferably 7,500-20,000 cps at 195° C. In addition, small amounts (0.5 to 10 eq. %) of a saturated linear carboxylic acid containing 5-20 carbons such as for example stearic and palmitic acid, or other reactive monomers such as phenyl benzoate or triphenylphosphite may be added to the mixture to control molecular weight and viscosity.

The relative quantities of the reactants are selected so that substantially equivalent numbers of reactive carboxyl and amine groups are present in the reaction mixture to produce a neutral or balanced poly(esteramide), i.e., the acid and amine numbers are substantially equal. Slight excesses of carboxyl or amine are acceptable but this ratio is preferably maintained between 0.9:1 and 1:1.1 so that acid and amine numbers will be less than 35, and preferably less than 20. Amine and acid numbers may be measured by conventional titrametric analytical techniques and are usually given as milligrams (or mg.) of potassium hydroxide per gram of product.

The required proportions of all reactants have been given above. Preferred proportions within the above-given ranges are as follows:

| | |
|---|---|
| polymeric fatty acid: | 10 to 60 equivalent % |
| dicarboxylic acid: | 40 to 90 equivalent % |
| diamine: | 40 to 90 equivalent % |
| diol: | 10 to 60 equivalent % |

It has been shown that for the polymers having the preferred proportions given above, open assembly time is inversely proportional to $T_{cc}$. In addition, polymers having $T_{cc}$'s less than or equal to room temperature have open assembly times of 70 seconds or greater. Further, polymers having nondetectable $T_{cc}$'s had open assembly times as high as 2200 seconds.

The following examples describe the manner and process of making and using the invention and set forth the best mode contemplated by the inventor of carrying out the invention but are not to be construed as limiting.

Ball and ring softening points were determined by the test method described in ASTM test method 28-58T. T-Peel strengths were determined by ASTM test method D-1876-72 at 0° C. and at 20° C. Melt viscosities were determined by the test method described in ASTM test method D-1084-63 Method B. Lap Shear strengths were determined by the method described in ASTM test Method D-1002-72. A DuPont 910 Differential Scanning Calorimeter (DSC) with a DuPont 990 Thermal Analyzer Controller was used to determine the $T_{cc}$ values. The $T_{cc}$ values were determined at the peak of the cooling curve exotherm when the cooling rate is 10° C./min. Open assembly times were determined by the method described in ASTM Draft No. 1, Nov. 3, 1978, entitled "Proposed Standard Test Procedure for Determining the Open Time of Hot Melt Adhesives".

EXAMPLE 1

A polymer was prepared with the following reactants:

| | Grams | Equivalents |
|---|---|---|
| polymeric fatty acid* | 57.0 | .201 |
| sebacic acid | 184.2 | 1.82 |
| piperazine | 84.2 | 1.95 |
| 1,4-cyclohexane dimethanol | 15.3 | .21 |
| stearic acid | 14.8 | .06 |

*Union Camp Corporation, Wayne, New Jersey;
Dimer 14 having the composition:
monomer 0.4 wt %
dimer 95.6 wt %
trimer (and high polymer) 4.0 wt %

The reactants were all charged in a resin kettle and refluxed at a temperature of 138°-160° C. with stirring, under a blanket of nitrogen gas for 3 hours. The mixtures was then heated gradually from reflux temperature to 225° C. while water was removed by distillation. Six drops of phosphoric acid were added, and the mixture was heated at temperatures of 210°-235° C. under a vacuum of 0.05 to 1 mm Hg for 3 hours. At the end of this time the viscosity of the polymer was determined to be 59000 CPS. Two and eight tenths gram of stearic acid were added to the polymeric melt, and the melt was stirred for 40 minutes under a nitrogen purge. Full vacuum (<1 mm) was then applied to the melt for an additional 40 minutes. After the vacuum cycle, the product was cast onto a Teflon coated glass sheet and allowed to cool.

EXAMPLES 2-4

The procedure of Example 1, supra., was repeated a plurality of times, except that the proportions of reactants were changed and/or the reactants were changed. The proportions, reactants and physical properties observed are set forth in the following Tables.

EXAMPLE 5

| | Grams | Equivalents |
|---|---|---|
| polymeric fatty acid* | 213.6 | .7548 |
| sebacic acid | 76.8 | .7596 |
| ethylenediamine (EDA) | 23.1 | .770 |
| ethylene glycol | 26.4 | .852 |

*Union Camp Corporation, Wayne, New Jersey;
Unidyme-14 having the composition:
monomer 0.4 wt %
dimer- 95.6 wt %
trimer (and high polymer) 4.0 wt %

The reactants were all charged in a resin kettle with 6 drops of phosphoric acid catalyst and refluxed at a temperature of 138°-160° C. with stirring, under a blanket of nitrogen gas for 3 hours. The mixture was then heated gradually from reflux temperature to 215° C. while water was removed by distillation. The mixture was heated at temperatures of 210°-235° C. under a vacuum of 0.1-2.5 mm Hg, for 3 hours. After this vacuum cycle 5 ml of triphenylphosphite was added to the mixture at a temperature of 165° C. The mixture was stirred for 25 minutes and vacuum was reapplied. The mixture was heated at temperatures of 210°-235° C. for 50 minutes. The reaction product was then poured onto a Teflon sheet and allowed to cool to room temperature. The test results are set forth in the following Table.

EXAMPLES 6-8

The procedure of Example 1, supra., was repeated a plurality of times, except that the proportions of reactants were changed and/or the reactants were changed. The proportions, reactants and physical properties observed are set forth in the following Tables.

EXAMPLE 9

The open assembly time of Example 8 was evaluated by a lap shear open assembly time test as described as follows: The lap shear open assembly time test consists of cleaning 1 inch steel coupons as described in ASTM Test Method D-1002-72, applying a film of the hot (190° C.) polymer to the bonding area of the coupons, and allowing the adhesive to cool specified lengths of time prior to overlapping the adhesive layers and applying several hundred psi force perpendicularly to the adhesive joint. The lap shear specimens are tested until shear failure on a stress-strain testing machine. Example 8 polymer exhibited an average lap shear strength of 458 psi upon testing of five specimens at zero time and 281 psi after 360 seconds.

TABLE
POLY(ESTER-AMIDE) FORMULATIONS AND PROPERTIES

| Example Number | Composition | Equivalents | Softening Point, °C. | Melt Viscosity at 195 cps | Acid No. | Amine No. | Adhesive Properties Lap Shear Strength (psi) | Adhesive Properties T-peel Strength (#/in) | Open Assembly Time (Seconds) |
|---|---|---|---|---|---|---|---|---|---|
| 1 | Dimer 14 | 0.20 | 162 | 15,500 | 2.3 | 4.5 | — | 1.1 | 20 |
|   | Sebacic acid | 1.82 | | | | | | | |
|   | Piperazine | 1.95 | | | | | | | |
|   | 1,4-CHDM | 0.21 | | | | | | | |
|   | Stearic acid | 0.06 | | | | | | | |
| 2 | Dimer 14 | 0.70 | 148 | 12,000 | 5.8 | 0.37 | 951 | 2.6 | 70 |
|   | Azelaic acid | 0.70 | | | | | | | |
|   | 1,4-CHDM | 0.72 | | | | | | | |
|   | HMDA | 0.73 | | | | | | | |
|   | Stearic acid | 0.01 | | | | | | | |
| 3 | Dimer 14 | 0.71 | 174 | 13,400 | 5.5 | 0.32 | 1134 | 4.8 | 10 |
|   | Azelaic acid | 0.71 | | | | | | | |
|   | PACM | 0.74 | | | | | | | |
|   | 1,4-CHDM | 0.72 | | | | | | | |
|   | Stearic acid | 0.02 | | | | | | | |
| 4 | Dimer 14 | 0.70 | 126 | 9,800 | 4.7 | 2.7 | 552 | 13.8 | 1,600 |
|   | Azelaic acid | 0.71 | | | | | | | |
|   | 1,3-propane-diamine | 0.72 | | | | | | | |
|   | 1,4-CHDM | 0.72 | | | | | | | |
| 5 | Dimer 14 | 0.75 | 161 | 300 | 25.3 | 5.5 | 606 | — | 15 |
|   | Sebacic acid | 0.76 | | | | | | | |
|   | EDA | 0.77 | | | | | | | |
|   | Ethylene glycol | 0.85 | | | | | | | |
|   | Triphenyl-phosphine | 0.006 | | | | | | | |
| 6 | Dimer 14 | 2.36 | 116 | 15,350 | — | — | 622 | 13.3 | 2,200 |
|   | Sebacic acid | 8.93 | | | | | | | |
|   | Piperazine | 7.49 | | | | | | | |
|   | 1,4-CHDM | 6.70 | | | | | | | |
|   | Phenyl Benzoate | 0.21 | | | | | | | |
| 7 | Dimer 14 | 1.22 | 112 | 5,200 | — | — | — | — | 1,300 |
|   | Sebacic acid | 10.0 | | | | | | | |
|   | Piperazine | 6.53 | | | | | | | |
|   | 1,4-CHDM | 6.41 | | | | | | | |
|   | Phenyl Benzoate | 0.21 | | | | | | | |
| 8 | Dimer 14 | 0.41 | 114 | 10,400 | 10.4 | 1.6 | 458 | 13.4 | 800 |
|   | Sebacic acid | 1.57 | | | | | | | |
|   | Piperazine | 1.27 | | | | | | | |
|   | 1,4-CHDM | 0.78 | | | | | | | |
|   | Phenyl Benzoate | 0.04 | | | | | | | |

What is claimed:

1. A poly(ester-amide) adhesive composition which comprises: the product of the random polymerization of
   (a) from 10 to 60 equivalent percent of a polymeric fatty acid and
   (b) from 40 to 90 equivalent percent of a dicarboxylic acid; with a substantially equivalent amount of
   (c) from 40 to 90 equivalent percent of an organic diamine and
   (d) from 10 to 60 equivalent percent of a diol.

2. The composition of claim 1 wherein the dicarboxylic acid is a straight chain aliphatic diacid having at least 6 carbon atoms.

3. The composition of claim 2 wherein the diacid has from 6 to 12 carbon atoms.

4. The composition of claim 3 wherein the diacid is selected from the group consisting of azelaic and sebacic acids.

5. The composition of claim 1 wherein the organic diamine is a straight chain aliphatic primary diamine with an odd number of carbon atoms.

6. The composition of claim 1 wherein the diamine is 1,3-diaminopropane.

7. The composition of claim 1 wherein the organic diamine is an aliphatic secondary diamine.

8. The composition of claim 1 wherein the diamine is piperazine.

9. The composition of claim 1 wherein the diol is ethylene glycol.

10. The composition of claim 1 wherein the diol is 1,4-bis(hydroxymethyl)cyclohexane.

11. The composition of claim 1 wherein the diol is 1,6-hexamethylene diol.

12. The composition of claim 1 wherein a second diamine is employed to vary open assembly times from 2220 seconds to 20 seconds.

13. The composition of claim 12 wherein the second diamine is ethylene diamine.

14. The composition of claim 12 wherein the second diamine is a cycloaliphatic diamine.

15. The composition of claim 12 wherein the second diamine is 4,4'-methylenebis(cyclohexylamine).

* * * * *